M. P. RUMNEY.
VEHICLE SPRING.
APPLICATION FILED SEPT. 8, 1913.
1,185,134.
Patented May 30, 1916.
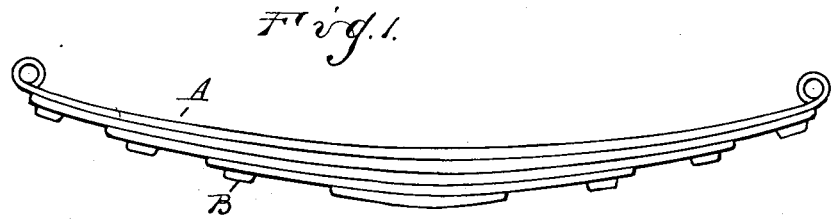
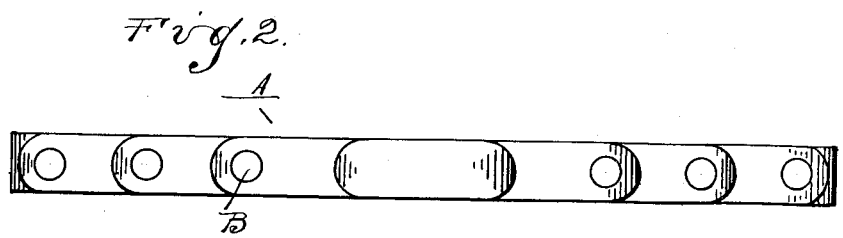
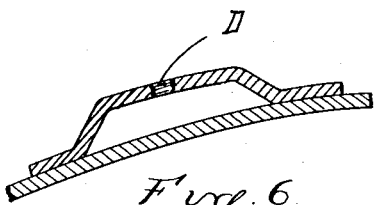
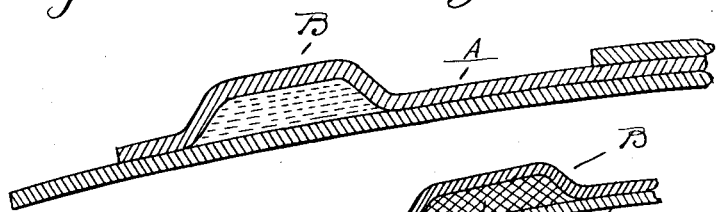
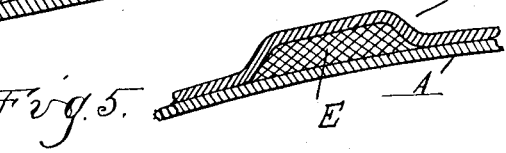
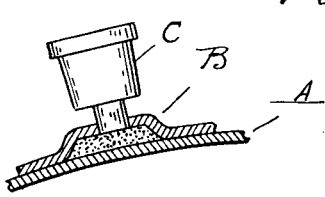
Inventor
Mason P. Rumney
Witnesses
James P. Barry
D. J. Collins
By
attys.

UNITED STATES PATENT OFFICE.

MASON P. RUMNEY, OF DETROIT, MICHIGAN, ASSIGNOR TO DETROIT STEEL PRODUCTS COMPANY, OF DETROIT, MICHIGAN, A CORPORATION OF MICHIGAN.

VEHICLE-SPRING.

1,185,134.        Specification of Letters Patent.     Patented May 30, 1916.

Application filed September 8, 1913. Serial No. 788,657.

*To all whom it may concern:*

Be it known that I, MASON P. RUMNEY, a citizen of the United States of America, residing at Detroit, in the county of Wayne and State of Michigan, have invented certain new and useful Improvements in Vehicle-Springs, of which the following is a specification, reference being had therein to the accompanying drawings.

The invention relates to vehicle springs of the leaf type, and it is the object of the invention to provide means for lubricating the contacting surfaces of the leaves. To this end the invention comprises the construction as hereinafter set forth.

In the drawings: Figure 1 is a side elevation of a semi-elliptic leaf-spring to which my improvement is applied; Fig. 2 is a bottom plan view thereof; Fig. 3 is an enlarged longitudinal section through portions of two adjoining leaves, as shown in Fig. 2; Figs. 4 and 5 are views similar to Fig. 3, showing a modified construction; and Fig. 6 is a section similar to Figs. 3, 4 and 5, showing a slightly modified form of closure for the lubricant receptacle.

In the use of these springs, it is well-known that the leaves move relatively one to the other and that after a short time they produce an unpleasant creaking noise, due to this motion. To overcome this, it is the ordinary practice to use a tool to separate the leaves and inject oil, or dope, between the leaves. This gives temporary relief, but as there is no means of holding the lubricant, the effect very quickly wears away. It has heretofore been suggested that the lubricant retaining recess be formed between the meeting faces of the springs, by cutting away portions of one or both springs, either in the shape of slight indentations or grooves, but this manner of providing for a lubricant retaining means reduces materially the strength of the spring—or of that leaf which is cut away. Particularly in automobile construction, it is well-known that it is very essential that the springs should not be weakened, as a breakage of a spring in traveling at a high rate of speed is apt to produce serious accident.

I propose to form a lubricant receptacle in the spring without weakening it to any material extent and without cutting away a portion of the leaf.

A represents the semi-elliptic spring formed of superimposed leaves of graduated length, as usual in such springs, and, this being a downwardly-bowed spring, the longest leaf is on top and the leaves gradually decrease in length to the lower one, the ends of each upper leaf projecting slightly beyond the next lower one. In these end portions, preferably each of the lower leaves or at least a plurality of them, I form a lubricant receptacle, B, by striking up the metal of the leaf between the side edges thereof. This lubricant chamber may be of any desired shape, although I prefer to make it circular, as shown.

Placing the lubricant receptacle in the overlapping end portions of the leaves does not interfere with the free movement of the leaves in relation to each other, and if these receptacles are filled with dope, they will retain the lubricant between the leaves for a long period of time after being once filled—which may be done in the usual manner.

Instead of filling the receptacle by separating the springs, I may provide a dope-cup, C, engaging in the face of the lubricant receptacle, as shown in Fig. 4, or I may provide a screw plug, D, through which the dope may be inserted, as shown in Fig. 6. Also, if desired, instead of merely putting the dope in the receptacle I may put in a pad of felt, or other fibrous material, as shown in Fig. 5, to better hold the lubricant.

What I claim as my invention is:

1. In a leaf spring, a leaf having a struck-up portion near the free end thereof forming a recess for containing lubricant and also provided with a marginal portion bearing upon an adjacent longer leaf for retaining the lubricant.

2. In a leaf spring, a leaf having a rounded struck-up portion near the free end thereof forming a recess for containing lubricant and also having a narrow marginal portion substantially parallel to said recess bearing against an adjacent longer leaf and forming a retainer for the lubricant.

3. In a leaf spring, a plurality of leaves, the leaf of intermediate length being provided with a struck-up portion which clears the adjacent shorter leaf, and forms a lubricant-containing recess sealed by the adjacent longer leaf.

4. In a leaf spring, a leaf having a struck-up portion adjacent to the free end thereof, forming a lubricant-containing and retaining pocket.

5. In a leaf spring, a leaf having a struck-up portion forming a lubricant-containing recess, an adjacent leaf for closing said recess, and means for supplying lubricant to said recess.

6. In a leaf spring, a leaf having a struck-up portion forming a lubricant-containing recess, and a lubricant cup secured to said struck-up portion for supplying lubricant to said recess.

7. In a leaf spring, a leaf having a struck-up portion forming a lubricant-containing recess, and a pad of absorbent material in said recess for distributing the lubricant to the adjacent leaf.

8. In a leaf spring, a leaf having a struck-up portion adjacent to the free end thereof, said struck-up portion extending externally from the spring and forming a lubricant-containing pocket.

In testimony whereof I affix my signature in presence of two witnesses.

MASON P. RUMNEY.

Witnesses:
ALBERT L. MARLATT,
H. S. DRUMMOND.